United States Patent Office 2,860,086
Patented Nov. 11, 1958

2,860,086

STABLE SOLUTIONS OF PURE CARDIOACTIVE GLYCOSIDES

Arthur Stoll, Arlesheim, Basel Land, and Emil Angliker, Frank Barfuss, and Walter Kussmaul, Basel, Switzerland, assignors, by mesne assignments, to Saul & Co., Newark, N. J., as nominee of Fidelity Union Trust Company, executive trustee under Sandoz Trust No Drawing. Application February 2, 1956
Serial No. 562,946

Claims priority, application Switzerland February 4, 1955

6 Claims. (Cl. 167—65)

The present invention relates to the preparation of stable aqueous solutions of pure cardioactive glycosides.

It has been generally accepted prior to the present invention that the pure cardioactive glycosides—hereinafter termed "cardiac glycosides"—are stable in neutral aqueous solutions and therefore undergo no changes in structure and suffer no loss of activity in such neutral solution. However, in connection with the present invention, it has been ascertained that this is not the actual case, but that splitting action due to hydrolysis takes place.

It is the primary object of the present invention to obviate this deficiency of the prior art, and to embody aqueous solutions of the cardiac glycosides, which solutions are in fact, i. e. to all practical intents and purposes, stable in that the mentioned hydrolysis does not take place or takes place with minimum velocity. This object is realized according to the present invention by embodying aqueous solutions of the cardiac glycosides, the pH of which is established at a value at which hydrolysis or hydrolytic splitting is essentially entirely suppressed. The surprising feature of such solutions is that such pH value is not at the neutral point but is on the weakly acid side.

In other words, the present invention proceeds in the face of the prior art teaching, according to which neutrality is essential to stability and an acid pH is generally required to effect hydrolysis, and establishes aqueous solutions which are not at the neutral point but are rather at a weakly acid pH in order to impart maximum stability thereto.

According to this invention, stable therapeutically-useful aqueous solutions of pure cardiac glycosides are obtained by adjusting the hydrogen ion concentration of such solutions—by the addition of a suitable buffer mixture—to the pH range at which the aforementioned chemical changes of the therapeutically active glycosides proceeds at a minimum rate.

The present invention makes it possible to impart maximum stability to aqueous solutions of pure cardiac glycosides, and to make it possible to subject such solutions to the action of elevated temperature or even to termal sterilization. This represents a considerable step forward in the art.

The solutions prepared according to the present invention are useful in heart therapy for the same purposes—for example in the treatment of congestive heart failure, auricular fibrillation and flutter, paroxysmal tachycardia, etc.—that the active cardiac glycosides contained therein (and the neutral aqueous solutions thereof) have heretofore been used and in the same manner.

The following examples set forth presently-preferred representative embodiments of the invention. In these examples, the parts and percentages, unless otherwise indicated, are by weight. The relationship between parts by weight and parts by volume is the same as that between grams and milliliters.

*Example 1*

A solution of 1 part by weight of lanatoside C—which is used medicinally in the same way as digitalis—in 350 parts of 96% ethanol and 100 parts by weight of glycerin is made up to 1000 parts by volume with $1/10$ molar aqueous disodium phosphate-citric acid buffer solution with a pH of 5.0. The resultant drops (solution which is adapted to be used in the form of drops) have a pH of 5.8.

*Example 2*

A solution of 0.200 part by weight of desacetyl-lanatoside C—which is useful medicinally in the same way as digitalis—in 80 parts by weight of 96% ethanol and 150 parts by weight of glycerin is made up to 1000 parts by volume with $1/30$ molar aqueous disodium phosphate-citric acid buffer solution with a pH of 6.0. The resultant solution, which may be put up in the form of ampoules, has a pH of 6.2.

*Example 3*

A solution of 0.100 part by weight of acetyl-digitoxin—which is useful medicinally in the same way as digitalis—in 450 parts by volume of 96% ethanol and 100 parts by weight of glycerin is made up to 1000 parts by volume with $1/15$ molar aqueous sodium acetate-acetic acid buffer solution with a pH of 4.7. The resultant solution, which may be put up in the form of ampoules, has a pH of 5.5

*Example 4*

A solution of 0.500 part by weight of acetyl-digitoxin in 550 parts by weight of 96% ethanol and 100 parts by weight of glycerin is made up to 1000 parts by volume with $1/5$ molar aqueous sodium acetate-acetic acid buffer solution with a pH of 4.2. The resultant solution, which may be dispensed as drops, has a pH of 5.5.

*Example 5*

A solution of 0.200 part by weight of Digilanid (a mixture of the three isomorphous digilanides—lanatoside A, lanatoside B and lanatoside C—obtained from the leaves of *Digitalis lanata*, and useful medicinally after the manner of digitalis) in 300 parts by weight of 96% ethanol and 150 parts by weight of glycerin is made up to 1000 parts by volume with $1/15$ molar aqueous disodium phosphate-citric acid buffer solution with a pH of 5.2. The resultant solution, which may be put up in the form of ampoules, has a pH of 5.8.

*Example 6*

A solution of 0.500 part by weight of Digilanid in 300 parts by weight of 96% ethanol and 80 parts by weight of glycerin is made up to 1000 parts by volume with $1/10$ molar aqueous disodium phosphate-citric acid buffer solution with a pH of 5.2. The resultant solution, which may be dispensed as drops, has a pH of 5.8.

*Example 7*

A solution of 0.500 part by weight of k-strophantho-side—which is useful medicinally after the manner of digitalis—in 50 parts by weight of 96% ethanol and 100 parts by weight of glycerin is made up to 1000 parts by volume with $1/30$ molar aqueous disodium phosphate-citric acid buffer solution with a pH of 6.0. The pH of the resultant solution, which may be dispensed in ampoules, is 6.2.

Example 8

A solution of 0.500 part by weight of Scillaren (a mixture of the genuine glycosides of fresh squill, *Urginea maritima,* and which are useful medicinally after the manner of digitalis) in 60 parts by weight of 96% ethanol and 150 parts by weight of glycerin is made up to 1000 parts by volume with 1/14 molar aqueous disodium phosphate-citric acid buffer solution with a pH of 5.8. The pH of the resultant solution, which may be dispensed in ampoules, is 6.0.

Example 9

A solution of 0.800 part by weight of Scillaren in 100 parts by weight of 96% ethanol and 100 parts by weight of glycerin is made up to 1000 parts by volume with 1/14 molar aqueous disodium phosphate-citric acid buffer solution with a pH of 5.8. The resultant solution, which may be dispensed as drops, has a pH of 6.0

Example 10

A solution of 0.100 part by weight of Digitoxin (crystalline digitalin)—useful medicinally like digitalis—in 450 parts by volume of 96% ethanol and 100 parts by weight of glycerin is made up to 1000 parts by volume weight 1/15 molar aqueous sodium acetate-acetic acid buffer solution with a pH of 5.5. The resultant solution, which may be dispensed in ampoules, has a pH of 6.2.

Example 11

A solution og 1.000 part by weight of Digitoxin in 550 parts by weight of 96% ethanol and 100 parts by weight of glycerin is made up to 1000 parts by volume with 1/5 molar sodium acetate-acetic acid buffer solution with a pH of 5.2. The resultant solution, which may be dispensed as drops, has a pH of 6.2.

Having thus disclosed the invention, what is claimed is:

1. A stable aqueous solution of a pure cardioactive glycoside, the pH of which is at that point in the range between 5.5 and 6.5 which corresponds to maximum stability of the said glycoside.
2. A stable aqueous solution of lanatoside C, the pH of which is 5.8.
3. A stable aqueous solution of desacetyl-lanatoside C, the pH of which is 6.2.
4. A stable aqueous solution of acetyl-digitoxin, the pH of which is 5.5.
5. A stable aqueous solution of k-strophanthoside, the pH of which is 6.2.
6. A stable aqeuous solution of Scillaren, the pH of which is 6.0.

References Cited in the file of this patent
UNITED STATES PATENTS 2,052,150    Torigian _____ Aug. 25, 1936